UNITED STATES PATENT OFFICE.

GEORGE GRANT HEPBURN, OF CHORLTON-CUM-HARDY, MANCHESTER, ENGLAND.

PROCESS FOR THE SOFTENING OF WATER.

1,426,636.  Specification of Letters Patent.  Patented Aug. 22, 1922.

No Drawing.  Application filed August 17, 1921. Serial No. 493,112.

*To all whom it may concern:*

Be it known that I, GEORGE GRANT HEPBURN, a subject of the King of Great Britain and Ireland, and resident of 52 Newport Road, Chorlton-cum-Hardy, Manchester, England, have invented a new or Improved Process for the Softening of Water (for which I have filed an application in England July 24, 1920), of which the following is a specification.

This invention has for its object to provide a new or improved process for the softening of water.

By investigation and experiment, I have found that if the peat previous to its use as a medium for destroying the hardness of water be treated with a solution of an alkali chloride or with a solution of a salt of an alkali metal, the anion of which can form with the metal or metals to which the hardness of the water is due, an easily soluble salt or if the peat after its use as a medium for destroying the temporary hardness of water and when its softening effect upon the water is exhausted be treated with a suitable alkali salt such as, sodium bicarbonate, sodium carbonate or with caustic soda, (the peat being preferably washed after such treatment) then there are produced the insoluble or difficultly soluble salts of the alkali metals with ulmic or humic acid substances which are effective in destroying the salts which produce both temporary and permanent hardness of water and further such difficultly soluble salts after their softening action on the water has become exhausted can be reconverted by a regenerative process for re-use.

My invention comprises the softening of water by filtering the same through a mass consisting of or containing the insoluble or difficultly soluble salts of the alkali metals with humic or ulmic acid substances, whereby insoluble salts of the metals of the alkaline earths (causing the hardness of the water) with the said humic or ulmic substances are formed, and remain in the filtering mass, where they can be reconverted by regenerative process into the insoluble or difficultly soluble salts of the alkali metals for re-use.

My invention further comprises the filtration of water for softening purposes through a mass of peat that has been previously treated with a solution of an alkali salt to remove the soluble constituents thereof and to transform any free humic or ulmic acid substances or the lime or magnesia salts of such substances into their sodium salts.

My invention further comprises the processes hereinafter described for regenerating the mass after use.

In one convenient application of my invention, the hard water is submitted to the action of peat that has been previously treated preferably at a higher temperature with a solution of an alkali chloride, such as sodium chloride, or other suitable alkali salt (the peat being preferably washed after such treatment). The softening action can be conducted in the cold or at a higher temperature and either intermittently or continuously.

After a given weight of peat has softened a certain volume of water (the volume of water softened depending on the hardness of the water), its softening power becomes exhausted, but I find that the peat can be regenerated or revivified by treating it with a solution of a salt of an alkali metal (such as sodium or potassium chloride), the anion of which can form with the metal or metals to which the hardness of the water was due, an easily soluble salt.

The regenerative treatment may, like the softening process, be conducted in the cold or at a higher temperature and either intermittently or continuously, but it is preferably performed intermittently.

As the regeneration depends on reverse action, it is preferable to use an excess of the regenerative agent.

The softening action of the regenerated peat evidently depends on the formation of insoluble or very difficultly soluble salts of the alkaline earths with the humic and allied peaty acids occurring in the peat and in order to increase the softening power of the peat it may be artificially enriched in these acids; or these acids may be used alone, or mixed with an independent diluting agent to facilitate filtration. Where such acids are used, it is preferable to convert them by means of caustic or other alkali such as caustic soda or sodium carbonate, at the ordinary or at a higher temperature into salts of the alkali metals before use for softening purposes.

If the water to be softened be filtered through a mass of raw peat, then the softening property of the latter is rapidly exhausted and in the absence of an alkali salt, the peat only destroys the salts producing temporary hardness in the water without effecting the salts producing permanent hardness, but after regeneration and the production as hereinbefore described of the insoluble or difficultly soluble salts of the alkali metals with the peaty acids occurring in the peat, the salts producing both the temporary and permanent hardness of the water are destroyed, and insoluble salts of the metals of the alkaline earths (causing the hardness of the water) with the said humic substances are formed and remain in the filtering mass where they can be regenerated.

Some qualities of peat discolour water to a great extent. This discolouration may be greatly diminished or obviated by treating the peat previous to softening, with a small percentage of a suitable magnesia salt such as magnesium sulphate, or of a suitable salt of alumina, such as aluminium sulphate; or such salts may be added to the water undergoing softening.

Water treated as before described may be easily softened from a high degree to zero degrees of hardness at a speed, and with quantities of peat that allow of the technical application of the process.

As an example of the application of my invention, I placed one kilogramme of air dried peat in a filter and passed a hard water therethrough until the peat had no further softening action thereon. When the water level in the filter was flush with the surface of the peat bed, 2 litres of sodium chloride solution containing 250 grammes of NaCl per litre were added to the peat, the whole thoroughly mixed and heated at 70 degrees centrigrade for two hours. The peat bed was then drained, washed and again used for water softening purposes with the following results:—

Hardness of water fed into filter:—
23.86° Clark of which 6.73° due to magnesia salts.
Alkalinity—11.55° Clark.

Depth of peat bed_____ 13.5 cm.
Rate of filtration_____ 79.05 cm. per hour.
Volume of filtrate_____ 87 litres.
Hardness of filtrate____ 1.75° Clark.

Filtration was now continued till the filtrate had attained a hardness of 12° Clark which indicated that the softening action of the peat had practically ceased. The regeneration of the peat with salt solution in the manner above indicated was repeated except that the period of regeneration was extended to 12 hours and the temperature used was 10 to 12 degrees centigrade. Filtration and softening was again effected with the following results:—

Depth of peat bed_____ 13.5 cm.
Rate of filtration_____ 64 cm. per hour.
Volume of filtrate_____ 34.4 litres.
Hardness of filtrate____ Zero.

When the filtrate had reached a volume of 59.8 litres, the hardness of the whole filtrate was 0.9 Clark.

The peaty acids may be extracted from the peat by boiling the latter with the hydrates or carbonates of sodium or potassium, the acids being precipitated by the addition of an acid such as hydrochloric acid or sulphuric acid and being recovered by filtration. The peaty acids may be used alone for water softening purposes, or in combination with peat or may be mixed with inert material such as sawdust or quartz.

I claim:—

1. The process of softening water which consists in filtering the same through a mass containing the insoluble or difficultly soluble salts of alkali metals with humic or ulmic acid substances whereby insoluble salts of the metals of the alkaline earths which cause the hardness of the water, with the said humic or ulmic substances are formed and remain in the filtering mass, then reconverting the said salts by regenerative process into the insoluble or difficultly soluble salts of the alkali metals for re-use, as set forth.

2. The process of softening water which consists in treating peat with a solution of alkali salt such as caustic soda or potash for removing the soluble constituents thereof and for transforming any free humic or ulmic acid substances such as lime and magnesia salts of such substances into their alkali salts, then filtering the water to be softened through the peat mass containing the insoluble or difficultly soluble salts of the alkali metals with humic or ulmic acid substances whereby insoluble salts of the metals of the alkali earths causing the hardness of the water with the said humic or ulmic substances, are formed and remain in the filtering mass, then re-converting the said salts by a regenerative process into the insoluble or difficultly soluble salts of the alkali metals for re-use.

3. In the process of softening water, as claimed in claim 2, regenerating the filtration mass by treatment with a solution of a salt of an alkali metal, the anion of which can form with the metal or metals to which the hardness of the water is due an easily soluble salt as set forth.

In testimony whereof I have signed my name to this specification.

GEORGE GRANT HEPBURN.